United States Patent [19]

Fickelscher

[11] Patent Number: 4,521,158

[45] Date of Patent: Jun. 4, 1985

[54] FLUID-FLOW MACHINE

[75] Inventor: Kurt G. Fickelscher, Frankenthal, Fed. Rep. of Germany

[73] Assignee: Balcke-Duerr AG, Ratingen, Fed. Rep. of Germany

[21] Appl. No.: 528,225

[22] Filed: Aug. 31, 1983

[30] Foreign Application Priority Data

Sep. 6, 1982 [DE] Fed. Rep. of Germany ....... 3233078

[51] Int. Cl.³ .............................................. F03B 3/14
[52] U.S. Cl. .................................. 416/160; 416/163; 415/129
[58] Field of Search ................ 415/129, 130; 416/160, 416/163

[56] References Cited

U.S. PATENT DOCUMENTS

| 2,460,559 | 2/1949 | Wildhaber | 416/160 X |
| 2,487,836 | 11/1949 | Turnbull | 416/160 X |
| 3,098,184 | 7/1963 | Deriaz | 416/160 X |
| 3,536,415 | 10/1970 | Kusiak | 416/160 |
| 3,901,626 | 8/1975 | McMurtry | 416/160 X |
| 3,902,822 | 9/1975 | Andrews et al. | 416/160 X |
| 3,964,839 | 6/1976 | Kusiak | 416/160 |
| 4,099,427 | 7/1978 | Fickelscher | 74/804 |

FOREIGN PATENT DOCUMENTS

| 897905 | 11/1953 | Fed. Rep. of Germany | 416/160 |
| 2082704 | 12/1971 | France | 416/163 |
| 443022 | 12/1948 | Italy | 416/163 |
| 52 | of 1907 | United Kingdom | 416/163 |
| 630773 | 10/1949 | United Kingdom . | |
| 1278825 | 6/1972 | United Kingdom | 415/129 |

OTHER PUBLICATIONS

Fickelscher, *Elektrizitaetswirtschaft*, vol. 79, No. 18, pp. 668-669 (1980).
Balcke-Duerr, *Verstelleinrichtung fuer Grosse Schaufelkraeft*, (1982) Brochure.

Primary Examiner—Everette A. Powell, Jr.
Attorney, Agent, or Firm—Schwartz, Jeffery, Schwaab, Mack, Blumenthal & Evans

[57] ABSTRACT

A fluid-flow machine, particularly of the hydraulic propeller-pump type, comprises a central hub, a bearing support fixed to the hub for rotation therewith, a plurality of blades distributed symmetrically around the hub, each blade having a pivotable blade-root for adjusting the angle of attack of the blades. The blade-roots are mounted on the bearing support for rotation around the longitudinal axis of the hub. An adjusting device pivots the blades about the longitudinal axis of the blade-roots, the latter including, for each blade, a self-locking reduction gear and a drive shaft. The bearing support is formed with open-ended housings, each corresponding to one of the blade-roots. The drive shafts, the reduction-gears and the blade-roots are mounted, at least partially, within the housings aforesaid.

18 Claims, 2 Drawing Figures

FLUID-FLOW MACHINE

The invention relates to a fluid-flow machine, more particularly to a hydraulic propeller-pump, comprising a hub adapted to rotate about a longitudinal axis and blades adapted to rotate about their respective axes, the roots of the said blades being mounted in bearing-supports in the said hub. Also provided is an adjusting device comprising a self-locking reduction-gear and drive-shaft for each blade.

In the case of fluid-flow machines, it is known that the angle of attack may be preset, thus adapting the machine to given requirements. This applies not only to driving machines, such as hydraulic turbines, but also to working machines, such as hydraulic propeller-pumps, fans or blowers. Reference is made here above all to hydraulic propeller-pumps with so-called variable-pitch propellers which are adaptable to different operating conditions intended to achieving high efficiency, it being possible to alter the output steplessly from about 0 to about 140% of the nominal output. The machine can be started up smoothly, against a back-pressure flap and with the propeller closed, thus allowing the run-up time to maximal output to vary between about 20 sec. and several minutes. Pressure-surges during starting can also be largely avoided, while the low power required for starting gives a faster run-up. This allows an advantageous design of drive-motors. Finally, when the drive-motor is switched off, a closing signal may be released to the above-mentioned adjusting device so that, as the propeller slows down, the blades thereof assume a so-called wind-milling setting and any reversal of the direction of rotation is prevented. In the case of complex pipeline systems, the output can also be altered, if necessary, by adjusting the blades, with a certain amount of delay, in order to avoid pressure-surges during starting and water-hammer in a back-pressure flap, located in the pipeline system, during shutting down. The above-mentioned relationships are of special significance for modern cooling-water pumps which are designed for outputs of up to 120 $m^3/h$ with delivery heads of between 8 and 32 m. In existing machines, almost all of the torque acting upon the adjustable blades also acts upon the adjusting device, which must therefore be designed for heavy loads and is thus heavy and bulky. If the blades are to be adjusted while the machine is in operation, a correspondingly high adjusting moment must also be applied through the adjusting device, so that heavy-duty adjusting motors and transmission means are necessary.

In the case of known fluid-flow machines, especially propeller-pumps, production and investments costs are obviously greatly increased by the adjusting device, the blade-mountings, and the reduction gear. For these reasons, adjustable blades have hitherto often been dispensed with and higher operating costs have been accepted in favour of fluid-flow machines having stationary blades.

German Pat. No. 897,905 describes an apparatus for adjusting the blades of axial-flow rotors, more particularly blowers. In this case a reduction-gear is provided in the hub for each blade, this reduction gear comprising a threaded shaft arranged in parallel with the longitudinal axis of the hub. An articulated element and two levers are in operative communication with the threaded shaft through a nut. The resulting angle of adjustment of the blades is very small and any increase involves a corresponding increase in the axial length of the hub. Furthermore, appropriate bearings must be provided in the hub for the threaded shafts and these must be designed for comparatively large forces, at least in the direction of the axis of rotation. The torque applied to the blade produces a correspondingly large axial force which must be absorbed by the bearings. This results in not inconsiderable structural complexity.

It is therefore the purpose of the present invention to provide a fluid-flow machine, of the type mentioned above, at low material and productions costs and in such a manner as to obtain simple and reliable adjustability of the blades. Reliable adjustment is moreover assured with a unit of low weight which also takes up little space. The hub is of compact construction and the reduction gears are incorporated thereinto at small structural expense.

In view of the above object, it is proposed that each reduction gear, with the relevant blade-root, be arranged in the bearing-support associated therewith, and that the drive-shaft be mounted by means of a bearing associated with the bearing-support.

The design of the fluid-flow machine according to the invention is simple and inexpensive, especially since, because of the reduction gear, the moments applied to the blades are almost eliminated from the adjusting device. It is essential, in this connection, that the flow of force take the shortest path through the bearing-supports, and this greatly simplifies the construction of the fluid-flow machine. In addition to this, the proposed integration of the reduction gear and blade-root in the common bearing-support provides a particularly compact and weight-saving construction, since the bearing-support has no difficulty in absorbing the forces and moments. Moreover, the blade and gear may be preassembled, after which it is a simple matter to insert them into the hub, thus achieving not inconsiderable production advantages. It is expressly observed that, in the case of the fluid-flow machine according to the present invention, the drive-shaft bearings and the blade bearings are mounted in a common bearing support. It is also pointed out that, within the scope of the invention, other components may be interposed between the drive-shaft bearing and the bearing-support. It is a common factor in all embodiments that the integration of the bearing, the drive-shaft and the blade-root provides a reliable construction in which the flow of force follows the shortest path through the bearing-support, and optimal integration is achieved at low weight within a small space.

In one embodiment, the bearing-support comprises a preferably hollow cylindrical extension for the accommodation of the relevant blade-root and/or the reduction-gear, thus achieving a particularly compact and stable design in which the blade-root and reduction-gear are integrated one with the other. This extension, which is preferably integral with the bearing-support, ensures high stability and strength.

In one practical embodiment, the blade-root is connected to a ring component having a bearing-surface associated with the bearing-support. The bearing-surface is preferably arranged in a plane at right angles to the axis of the blade and is thus a component of the axial bearing of the blade.

In one particular embodiment, the drive-shaft of the reduction gear is supported by means of a bearing in the blade-root and/or in a component connected thereto. This provides a particularly reliable, compact and simple construction, since the supporting and mounting of the drive-shaft is achieved within the blade-root. It is desirable for this drive-shaft bearing to be a combination axial and radial bearing, more particularly a journal-thrust ball-bearing which is a particularly simple way of dispensing with external bearings or the like.

In one particular embodiment, a component connected to the blade-root is substantially cup-shaped and is provided with bearing-surfaces associated with corresponding surfaces of the bearing support in order to provide an axial and/or radial bearing for the blade. This produces a light and compact bearing-unit for the blade and the reduction-gear is at least partly integrated into the said component. Furthermore, the forces follow a comparatively short path, thus achieving optimal material utilization and loading.

In one particularly interesting embodiment, ring-gears of the reduction-gear are connected to the said cup-shaped component on the one hand and to the bearing-support on the other hand. This results in particularly favourable integration of the reduction-gear, bearing-support and blade-root.

In another embodiment, the reduction-gear is designed to be at least almost free of play. This freedom from play according to the invention ensures that intermittent forces acting upon the blades cannot lead to blade-vibration. This is of critical significance for reliability in hydraulic machines, especially propeller-pumps.

It is an advantage for the component connected to the blade-root, for the bearing-support, or for a ring-gear connected thereto, to be provided with an internally toothed ring gear. The said component is thus not designed merely as a mounting for the blade-root, but is also a part of the reduction-gear, thus achieving a compact design.

In one particularly interesting embodiment, the reduction-gear is in the form of a sliding-wedge drive comprising two adjacent central gears and ring-gears having different numbers of teeth and a planetary wheel, the teeth of the latter being pressed, by means of a force-transmitting drive-element, into the virtual gaps between the ring-gears of the said central gears. A sliding wedge drive of this kind is described in detail in U.S. Pat. No. 4,099,427, to which reference is expressly made. A drive of this kind allows very high torques to be transmitted within a very small space and, at the same time, ensures freedom from play. It produces resilient loading between the meshing teeth of the planetary wheel and central gears and this is a particularly simple way of ensuring freedom from play under all operating conditions. In addition to this, the sides of the meshing teeth slide one upon the other, thus damping the system, a matter of importance in connection with blade-vibration.

In another preferred embodiment, the planetary wheel of the reduction-gear comprises a toothed strip. Controlled by the oval or eccentric outer surface of the drive-shaft, the said toothed strip engages only partly in the virtual gaps between the teeth of the aforesaid ring-gears and/or slides upon the preferably flat sides of the teeth thereof. A sliding-wedge drive of this kind occupies little space, has low material and production costs, and can transmit comparatively high torques. Furthermore, a sliding-wedge drive of this kind can be integrated particularly satisfactorily with the bearing-support, the blade-root, and the above-mentioned component, thus achieving optimal material utilization.

In one practical construction, the various drive-shafts are preferably connected to a common adjusting shaft through externally-toothed bevel-gears, a particularly simple way of providing an operative connection. Furthermore, this greatly simplifies assembly and overall production, since the said connection can be produced by the above-mentioned bevel-gear without special structural expense.

In one preferred construction, the adjusting shaft passes through the machine shaft which is hollow. This allows the blades to be adjusted, while the unit is in operation, without additional expenditure, by means of the said adjusting shaft passing through the machine shaft. The adjusting procedure is initiated by an adjusting drive which will not be described here in detail.

In another preferred construction, the reduction-gear ratio is between 1:60 and 1:250, preferably between 1:85 and 1:200. These ratios obviously permit large adjusting moments to be applied reliably and to be transmitted without difficulty during continuous operation. It is again specially emphasized at this point that the reduction-gear according to the invention is kinematically self-locking and is substantially free from play.

Accordingly, the invention is broadly claimed herein as a fluid-flow machine, particularly of the hydraulic propeller-pump type, comprising: a central hub rotatable about a longitudinal axis thereof; a bearing support fixed to said hub for rotation therewith; a plurality of blades distributed symmetrically around said hub longitudinal axis, each blade having a pivotable blade-root for adjusting the angle of attack of said blades; means mounting said blade-roots on said bearing support for rotation of said blades around said hub longitudinal axis; an adjusting device for pivoting said blades about the longitudinal axis of said blade-roots; wherein said adjusting device includes, for each blade, a self-locking reduction gear and a drive shaft; wherein said bearing support is formed with open-ended housings, each corresponding to one of said blade-roots, and wherein said drive shafts, reduction-gears and blade-roots mounting means are mounted, at least partially, within said housings.

Further advantages and characteristics of the invention will be gathered from the following description of an embodiment in conjunction with the drawing attached hereto, wherein.

Figure 1:
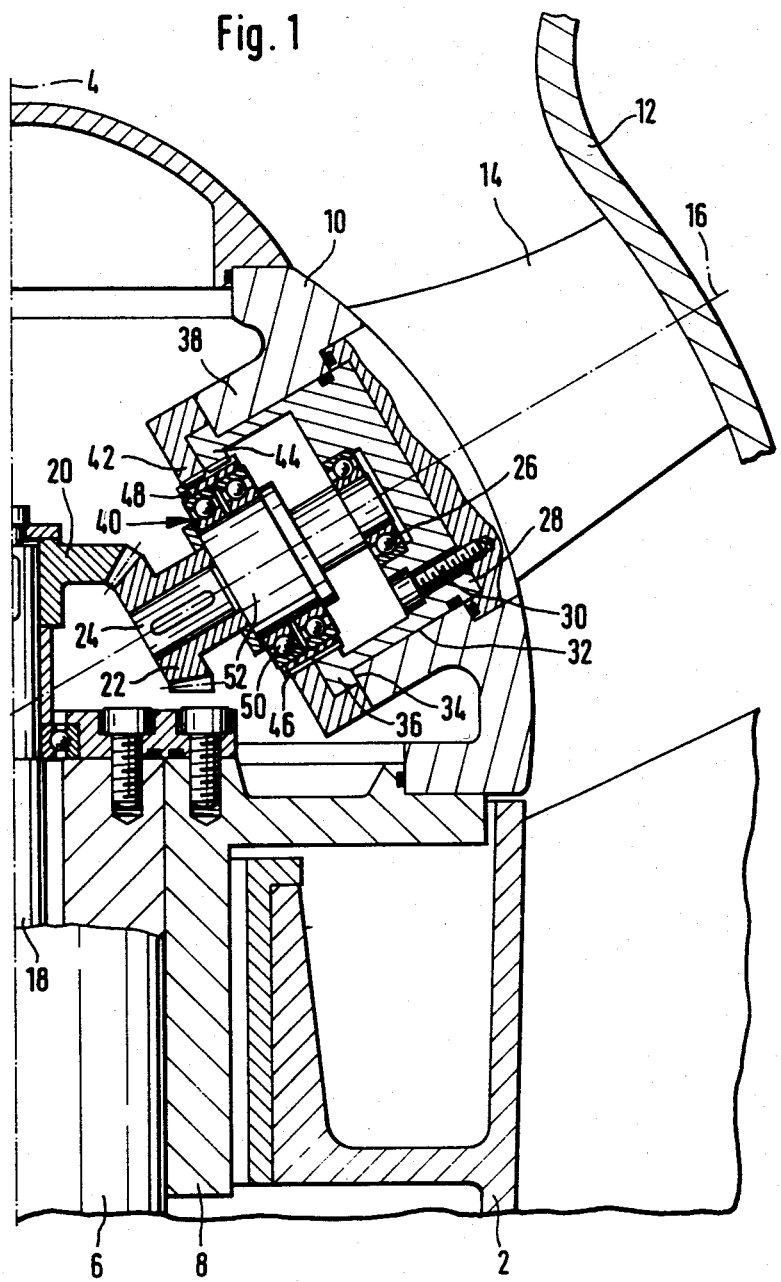
FIG. 1 is an axial longitudinal section through a working machine constructed as a propeller-pump and having a common adjusting shaft in the form of a hollow shaft.

FIG. 1 shows a stationary housing 2 of the machine in which a machine-shaft 6 is mounted to rotate about a longitudinal axis 4. Secured to the machine-shaft 6 is a hub 8 comprising a bearing-support 10. Arranged in the bearing-support 10, symmetrically around the longitudinal axis 4, is a plurality of blades 12, shown here only diagrammatically, with blade-roots 14, the blades 12 being pivotable about their axes 16 to allow them to be adjusted as required by the device described hereinafter.

A common adjusting shaft 18 is provided, the said shaft passing through the machine-shaft 6 which is in the form of a hollow shaft carrying at its front end an externally-toothed bevel-gear 20 engaging with bevel-gears 22 of individual blades 12. Each bevel gear 22 is located at the inner end of a drive-shaft 24 supported in a component 28 by means of a combined axial and radial bearing, in this case a journal-thrust bearing 26. The component 28 is generally cup-shaped and is secured to the blade-root 14 by means of screws 30. The drive-shaft 24 thus projects at least partly into the cup-shaped component 28, the outer radial and axial surfaces of which are supported on corresponding surfaces of the bearing-support 10. An axial outer surface 34 is located on a flange 36 of the component 28, the outside diameter of the flange 36 being larger than that of the remainder of the component 28. Thus the blade 12 is mounted rotatably in a hollow cylindrical extension 38 of the bearing-support 10 by means of an axial and radial plain bearing.

Also arranged on the extension 38 of the bearing-support 10 is a reduction gear 40 and the previously mentioned drive-shaft 24. In this case, the reduction-gear 40 is in the form of a sliding-wedge drive comprising two internal ring-gears 42, 44 having different numbers of teeth. The ring-gear 42 is secured to the extension 38 of the bearing-support 10 and cannot rotate in relation thereto, while the ring-gear 44 is arranged in the component 28 of the blade-root 14. These internally-toothed ring-gears 42, 44 constitute the central gears of the reduction-gear which is designed on the principle of a planetary gear. Because of the different numbers of teeth in the ring-gears 42, 44, virtual gaps exist between the teeth in which a toothed strip 46 of the planetary wheel engages. The strip 46 is placed outwardly upon a comparatively thin ring 48 supported by two ball-bearings 50 upon the outer surface 52 of the drive-shaft 24, the contour of the outer surface 52 being oval or eccentric. As a result of this configuration of the outer surface 52, the drive-shaft 24 has different diameters at two locations preferably at 90° to each other. The required reduction-ratios may be predetermined according to the difference in the number of teeth in ring-gears 42, 44. The reduction-gear according to the invention is kinematically self-locking, so that once the blades are adjusted to a particular angular setting, this setting is maintained even when high torques are applied to the blades. In addition to this, the proposed coupling is at least approximately free from play, so that intermittent forces acting upon the blades do not give rise to blade-vibration in practice.

Figure 2:
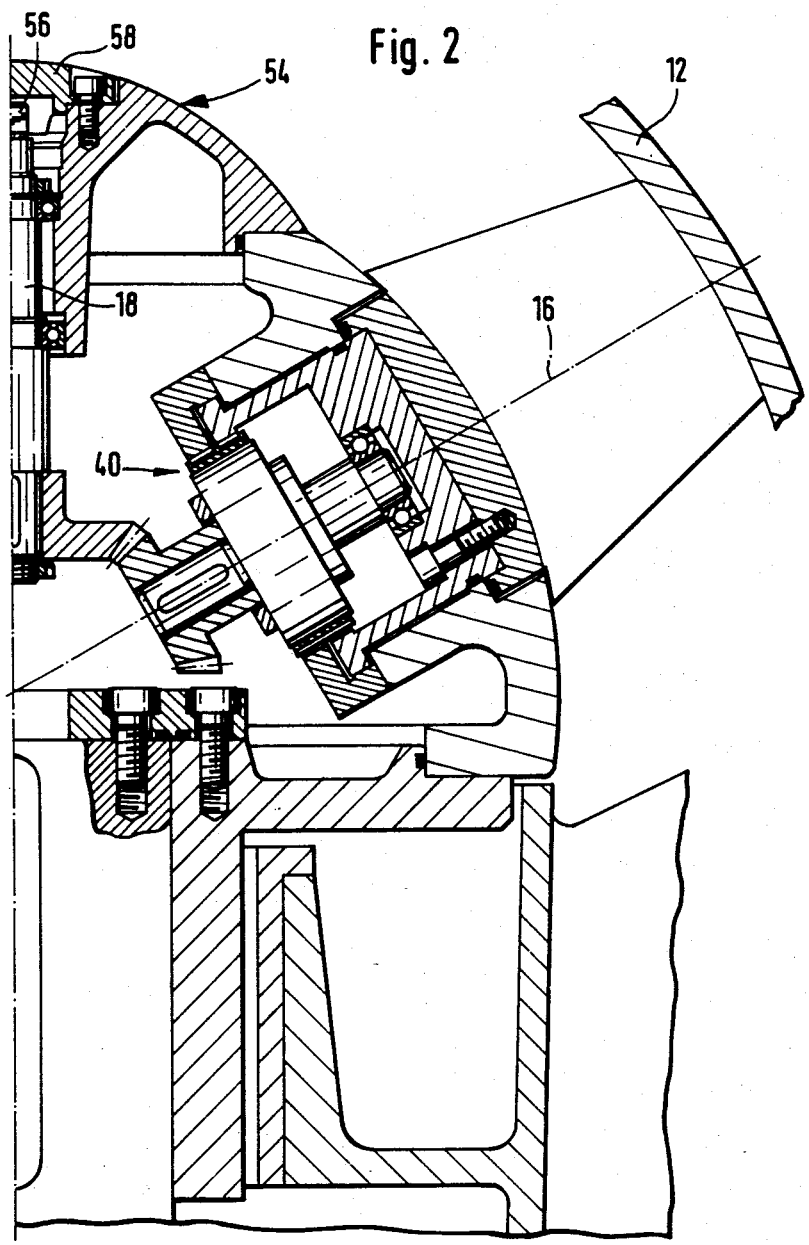
FIG. 2 is a machine similar to that in FIG. 1, but having a manually operated adjusting shaft.

The embodiment in FIG. 2 differs from that according to FIG. 1 in that in this case the adjusting shaft 18 does not pass through the machine shaft. Instead, the shaft 18 is mounted in tip 54 of the propeller. This no longer permits adjustment while the machine is in operation, but makes manual adjustment possible. The front end of the adjusting shaft 18 has a square head 56 to which a suitable tool may be fitted after removal of a cover 58. It will be seen that, here again, the blades 12 may be adjusted in relation to their axes 16 by rotating the adjusting shaft 18. It is expressly pointed out that the bearing-support, the coupling etc., are of identical design in both embodiments. Adjustment while the machine is in operation, on the one hand, or manual adjustment, on the other hand, depends upon the construction of the machine shaft 6 and of the adjusting shaft 18. There is no need to emphasize that this reduces production costs.

I claim:

1. A fluid-flow machine comprising:
    a hub rotatable about an axis,
    a bearing support member fixed to said hub for rotation therewith,
    a plurality of blade members mounted on said bearing support member and distributed symmetrically around said hub axis, each of said blade members having a blade-root which is pivotably received in an open-ended housing formed in said bearing support member, and
    adjusting means for pivoting said blade-roots and blades about a blade-root axis to adjust the angle of the blade, said adjusting means comprising for each housing and blade-root member a reduction gear drive shaft and a self-locking reduction gear drivingly interposed between the drive shaft and the blade-root,
    each said reduction gear drive shaft being rotatably mounted in a bearing supported on the associated blade-root for rotation relative to said blade-root about an axis parallel to said blade-root axis, and said reduction gear drive shaft being rotatable by turning of an adjusting shaft which drives a gear wheel fixed to the drive shaft.

2. A fluid-flow machine according to claim 1, wherein each said reduction gear drive shaft is mounted for rotation about an axis coaxial to the associated blade-root axis.

3. A fluid-flow maching according to claim 1, wherein each said reduction gear drive shaft is rotatably mounted in a bearing in a cup-shaped component fixedly secured to the associated blade-root.

4. A fluid-flow machine according to claim 3, wherein said cup-shaped components each comprises a radial outer surface and an axial outer surface acting as bearing surfaces allowing relative rotation between said blade-roots and said bearing support member.

5. A fluid-flow machine according to claim 3, wherein said adjusting device reduction gears each comprises ring-gears mounted in said housings, on said bearing support and on said components connected to said blade-roots.

6. A fluid-flow machine according to claim 1, wherein said adjusting device further includes two ring-gears in each of said housings, wherein said reduction gears are in the form of sliding-wedge drives each of which comprises said two ring-gears lying side by side in the direction of said drive-shafts and containing different numbers of teeth; wherein said reduction gears each also comprises a planetary wheel with teeth that are pressed, by a force-transmitting drive-element, into the gaps between the teeth of said ring-gears.

7. A fluid-flow machine according to claim 6, wherein the teeth of each planetary wheel are arranged upon toothed strips, and wherein each drive-shaft comprises an eccentric outer surface by means of which the teeth of the toothed strips are pressed, at least partly, into said gaps between the teeth of said ring-gears.

8. A fluid-flow machine according to claim 1, wherein said adjusting device comprises a common adjusting shaft for said reduction-gears, said adjusting shaft communicating with the relevant drive-shafts through gear means.

9. A fluid-flow machine according to claim 8, wherein said gear means comprise: an externally toothed driving bevel-gear secured to said adjusting shaft and driven bevel-gears secured to said drive shafts, the said driven bevel-gears meshing with said driven bevel-gear.

10. A fluid-flow machine according to claim 9, including a hollow machine shaft driving said central hub, said adjusting shaft extending through said hollow shaft.

11. A fluid-flow machine comprising:
a hub rotatable about an axis,
a bearing support member fixed to said hub for rotation therewith,
a plurality of blade members mounted on said bearing support member and distributed symmetrically around said hub axis, each of said blade members having a blade-root which is pivotably received in an open-ended housing formed in said bearing support member, and
adjusting means for pivoting said blade-roots and blades about a blade-root axis to adjust the angle of the blade, said adjusting means comprising for each housing and blade-root a reduction gear drive shaft and a self-locking reduction gear drivingly interposed between the drive shaft and the blade-root,
each said reduction gear drive shaft being rotatably received within a hollow component of the associated blade-root, and said reduction gear comprising a first ring gear formed on said component annularly around said reduction gear drive shaft and a second ring gear fixedly supported on said bearing support member coaxial to said first ring gear.

12. A fluid-flow machine according to claim 11, wherein said reduction gear drive shaft is rotatably mounted by means of a bearing in said hollow component.

13. A fluid-flow machine according to claim 11, wherein said reduction gear drive shaft is rotatable by turning of an adjusting shaft which drives a gear wheel fixed to the drive shaft.

14. A fluid-flow machine according to claim 11, wherein said reduction gears are in the form of sliding-wedge drives each of which comprises said two ring gears lying side by side in the direction of said drive shafts and containing different numbers of teeth; wherein said reduction gears each also comprises a planetary wheel with teeth that are pressed, by a force-transmitting drive-element, into the gaps between the teeth of said ring gears.

15. A fluid-flow machine according to claim 14, wherein the teeth of each planetary wheel are arranged upon toothed strips, and wherein each drive shaft comprises an eccentric outer surface by means of which the teeth of the toothed strips are pressed, at least partly, into said gaps between the teeth of said ring gears.

16. A fluid-flow machine according to claim 11, wherein said adjusting device comprises a common adjusting shaft for said reduction gears, said adjusting shaft communicating with the relevant drive shafts through gear means.

17. A fluid-flow machine according to claim 1, wherein said open-ended housings each comprise a hollow cylindrical extension formed on said bearing support member.

18. A fluid-flow machine according to claim 11, wherein said open-ended housings each comprise a hollow cylindrical extension formed on said bearing support member.

* * * * *